June 28, 1949. H. E. SHEARER ET AL 2,474,375
SHAPED FABRICATED ARTICLE
Filed April 5, 1945

John E. Van Nest
Howard E. Shearer
INVENTORS.
BY Carl A. Castellan
atty.

Patented June 28, 1949

2,474,375

UNITED STATES PATENT OFFICE 2,474,375

SHAPED FABRICATED ARTICLE

Howard E. Shearer and John E. Van Nest, Swarthmore, Pa., assignors to American Viscose Corporation, Wilmington, Del., a corporation of Delaware Application April 5, 1945, Serial No. 586,802

6 Claims. (Cl. 66—171)

This invention relates to generally cup-shaped fabricated articles comprising a self-sustaining peripheral wall and an end wall, and to sleeve-like fabricated structures which are readily formed into such shaped articles. The shaped articles are useful as protective and/or decorative jackets for objects of similar contour, such as drinking glasses, cups, vases, jars, flower pots, etc.

The jackets of the invention conform snugly to the contours of the objects to be jacketed so as to be clingingly held thereto against accidental displacement therefrom, and to provide an ensemble of neat, smooth appearance. The jackets are comparatively soft and attractive to the touch, and have the quality of flexibility whereby they are readily removable from the object and may be folded, rolled, or otherwise collapsed, if desired, while at the same time they are sufficiently rigid that upon removal from the object they are self-sustaining and do not tend to curl or wrinkle, or to automatically collapse upon themselves.

Figure 1:
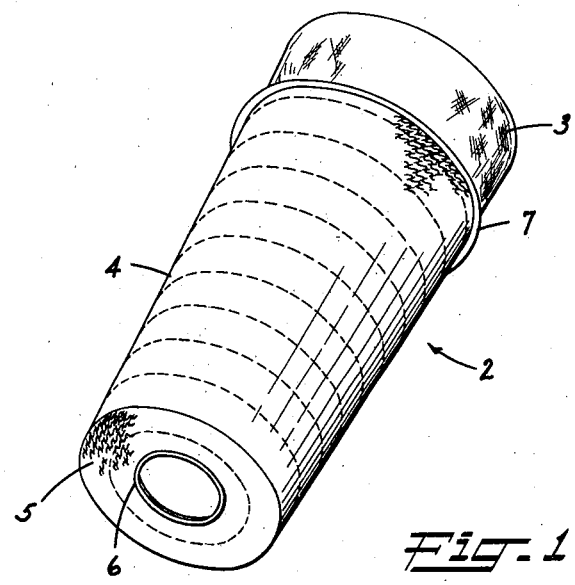
Figure 2:
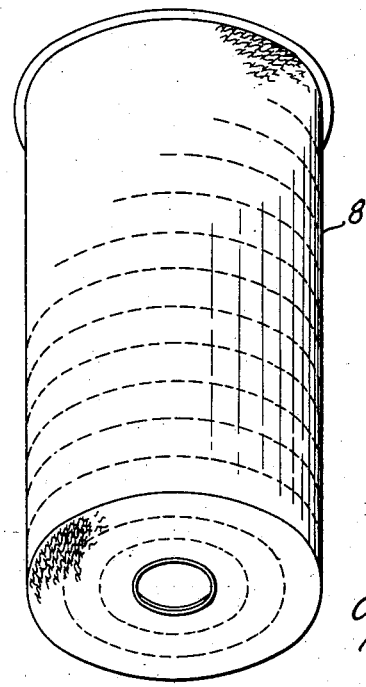

In the accompanying drawing which is illustrative of the invention,

Figure 1 is a view in perspective of a tumbler having a jacket in accordance with the invention over the exterior surface thereof; and Figure 2 is a view in perspective of a self-sustaining jacket representing one embodiment of the invention.

The jackets are made by knitting or weaving, and preferably knitting, single filament, multi-filament or plied yarns of special type to form a sleeve-like fabricated pre-form comprising at least some thermoplastic fibers which undergo pronounced shrinkage at comparatively low temperatures, and thereafter conforming the sleeve to the shape of the object, while the sleeve is in place thereon. The yarns from which the pre-form is fabricated may be formed entirely from thermoplastic fibers of the same kind and which all exhibit a high degree of shrinkage at comparatively low temperatures. Alternatively, the yarns may be formed from fibers all of which are of the thermoplastic type but which exhibit different shrinkage capacities or different shrinkage characteristics at any given temperature, or they may comprise fibers which are thermoplastic in combination with fibers which are non-thermoplastic. Where the yarns comprise thermoplastic fibers in combination with non-thermoplastic fibers or thermoplastic fibers which are not substantially effected at temperatures at which the more heat responsive fibers shrink and become stiffened, the pre-form may comprise a series of rings made up of courses of the different yarns, the rings comprising the thermoplastic fibers alternating regularly or irregularly with rings comprising the non-thermoplastic fibers or less heat responsive thermoplastic fibers. Further, the individual yarns comprising the pre-form may be composed of both thermoplastic and non-thermoplastic fibers or of thermoplastic fibers having different shrinkage properties.

After fabrication, the sleeve-like pre-form 2 is placed over the glass, cup, or other shaped object 3 to be jacketed, being arranged thereon in general conformance with the contours of the object and, while in place, the sleeve is subjected to heat to effect shrinkage and stiffening of the fibers having a high shrinkage capacity at comparatively low temperature. As a result of such shrinkage and stiffening the sleeve shrinks in and automatically assumes the contours of the generally cup-shaped object, after which it may be cooled to set it in the new shape. In placing the sleeve on a cup-shaped object to be jacketed, the lower end of the sleeve is tucked smoothly under the bottom of the object so that after heating to effect shrinkage and stiffening of the fibers, and setting the fibers comprising the shaped jacket in their new condition, the jacket comprises a self-sustaining peripheral wall 4 and an end wall 5 which forms a rest for the jacket. The shaped jacket may serve as a combination protective and/or decorative jacket and coaster for drinking tumblers or the like, the end wall serving to protect any surface upon which the drinking tumbler is placed from deterioration.

The sleeve in place on the drinking glass or other object may be heat-treated in any appropriate manner. For example, is it convenient to effect conformance of the sleeve to the contours of the object by submerging the object having the pre-form in place thereon in water heated to a temperature above the temperature at which the fibers to be activated shrink, the diffusion of the heat through the yarn serving to activate the fibers to shrink and stiffen them. The activated fibers may be set in the new condition in any suitable manner, as by cooling, and where appropriate this may be accomplished by submerging the object carrying the shaped jacket in cold water and permitting the jacketed object to stand under conditions such that the activated fibers are set. The degree of stiffness imparted to the jacket is controlled by the proportion of thermoplastic fibers present which shrink and stiffen at the activating temperature. By selective combination of such fibers or yarns with yarns formed from fibers which are not effected at the given activating temperature it is possible to provide a snug-fitting jacket which is self-sustaining without being stiff and coarse to the touch and which is sufficiently flexible to permit easy removal thereof from the cup-shaped object.

If the cup-shaped jacket is subjected to deformation when not in use, or loses its shape for any reason, as during laundering or dry-cleaning, it is immaterial because it may be again brought to the desired shape by subjecting it, in place on the object to be protected, to heat-treatment to restore it to the shaped condition.

The thermoplastic fibers which are to be heat-shrunk and stiffened to effect shaping of the sleeve in place on the object to be jacketed are preferably fibers which have been stretched either during manufacture or subsequently thereto while in a cold unsoftened state or while in a somewhat softened and plastic condition, the stretching being performed in such a manner that the fibers are permanently extended and have the property of shrinking when rendered plastic by heating.

The yarns may comprise fibers formed from thermoplastic fiber-forming substances or substances which may be rendered thermoplastic, such as cellulose derivatives, e. g., cellulose esters of the type of cellulose acetate, cellulose propionate, cellulose butyrate; mixed cellulose esters of the type of cellulose aceto-propionate, aceto-butyrate; or the like; organic solvent-soluble cellulose ethers, such as methyl, ethyl, benzyl cellulose, etc.; mixed cellulose ethers; mixed cellulose ester-ethers such as methyl cellulose acetate, ethyl cellulose propionate, etc. The yarns may comprise fibers formed from thermoplastic resins, or thermosetting resins in thermoplastic condition, such as vinyl resins, which term includes the acrylate and alkacrylate resins, polymers of vinyl esters, such as vinyl acetates; polymers of vinyl ethers; such as vinyl acetals; vinylidene halides, polyethylenes; nylons; methacrylate polymers; copolymers of vinyl esters and vinyl halides, notably copolymers of vinyl acetate and vinyl chloride, copolymers of vinyl chloride and acrylonitrile; copolymers of vinylidene chloride and vinyl chloride, such as "Saran," etc.

Where the pre-form comprises yarns formed from fibers having different shrinkage capacities at a given temperature, the yarns may comprise fibers formed from the same type of fiber-forming materials but which exhibit differences which influence their responsiveness to heat. Thus, all of the yarns may be formed from cellulose derivatives, such as cellulose acetates or ethyl celluloses, but which derivatives or their solutions differ as to viscosity, equivalent cellulose content, or as to degree of polymerization or substitution of the cellulose chains therein, by reason of which disparities the fibers formed therefrom exhibit different degrees of heat-sensitivity. In the case, where the yarns comprise fibers formed from resins having different shrinkage properties, the resinous solutions may differ as to viscosity, the degree of polymerization of the resin, or in other respects leading to the formation of fibers having different shrinkage characteristics at a given temperature. Furthermore, some of the yarns constituting the sleeve-like pre-form may be formed from fibers of a fiber-forming material which is of an entirely different type from that comprising the fibers of the other yarns. Thus, fibers comprising cellulose acetate may be combined with fibers of a vinyl resin, or fibers of a nylon and of a vinyl resin or cellulose acetate may be combined. Further, yarns comprising the thermoplastic fibers, such as fibers formed from the vinyl resins, nylons, or the like may be combined with yarns comprising non-thermoplastic fibers of the type of cotton, regenerated cellulose, linen, wool, natural silk, etc.

The yarns making up the various rings of the sleeve-like pre-form may be in monotone, or they may be vari-colored, for matching or harmonizing with decorative schemes such as table decors, for example.

Although it is preferred to fabricate the sleeve-like pre-form by knitting the yarns on a circular knitting machine, the structure may also be woven and where fibers having different shrinkage capacities are utilized, the thermoplastic fibers, or the more heat-sensitive thermoplastic fibers, may alternate regularly or irregularly in the warp or weft or both with non-thermoplastic fibers or thermoplastic fibers which are substantially un-effected or only effected to a slight extent by the temperatures employed to cause shrinkage and stiffening of the more readily shrinkable fibers.

In knitting the tubular sleeve, it is advantageous to run in a few courses, say 10 or 12, of yarn formed from non-thermoplastic fibers such as cotton fibers, to provide a few rows of non-thermoplastic material at the bottom of the sleeve and, after the sleeve has been shaped in place on a drinking glass or other object, to unravel the cotton threads which occur at the inner periphery of the open end wall of the shaped jacket so as to cause the end wall to lie flat and prevent the jacket from curling at the bottom. If the yarns occurring at the inner periphery of the open end wall of the sleeve are of the thermoplastic variety which are effected at the given temperature, when the sleeve is placed on a drinking glass or other object to be jacketed the yarns may be rolled, prior to heating the sleeve, so that the shaped jacket is provided with a stiffened, rolled non-curling bottom edge 6. Also, in feeding the yarns to the knitting machine, it is preferred to arrange the yarns so that when the sleeve is shaped in place on the container for which it is to provide a protective jacket, the rings occurring at the top and bottom of the peripheral wall comprise the thermoplastic or more readily shrinkable thermoplastic fibers, thus insuring that after shrinkage and stiffening of the fibers the opposing ends of the peripheral wall of the shaped jacket are stiffened and reinforced. Advantageously, also, the activatable fibers around the upper rim of the sleeve may be rolled down, prior to shaping the sleeve, and heat-shrunk and stiffened in the rolled condition, to provide the shaped jacket with a rolled and stiffened rim 7 about the upper peripheral wall thereof which prevents the jacket from curling at the top.

In Figure 2 of the drawing there is shown a self-sustaining jacket comprising rings 8 comprising yarns formed from fibers of a copolymer of vinyl acetate and vinyl chloride which alternate regularly with rings comprising a like number of courses of yarns formed from fibers of a cellulose acetate. The alternating rings may be of the same or different colors, or of different degrees of stiffness.

Generally cup-shaped fabric protective jackets having a self-sustaining peripheral wall and an end wall, and obtained in accordance with the invention, are useful for many purposes. They form protective and decorative jackets for drinking tumblers, cups, vases, flower pots and the like and since they are shaped to such objects while in place thereon they fit smoothly without wrinkling or distortion. The jacket may be modified by the selection of the fibers constituting it to adapt it to special uses. For example, when the jacket is to serve as a protective jacket for a flower pot or a plant pot, the sleeve from which the jacket is to be shaped in place on the pot may be knitted from yarns comprising fibers of a copolymer of vinyl chloride and vinyl acetate and yarns comprising cellulose acetate fibers to provide, after shaping the sleeve on the pot, a protective or decorative jacket therefor which is resistant to mildew.

The jacket may also be modified by incorporating with the yarns forming the sleeve-like preform a small proportion of bibulous fibers, such as wool fibers, to enhance the ability of the jacket to absorb moisture which may be condensed on the walls of the drinking glass or other container.

The sleeve-like pre-form may be shaped and marketed in the shaped form or it may be marketed as such and after-shaped by the consumer.

The following examples will illustrate the invention.

*Example I*

Yarns comprising fibers formed from a copolymer of vinyl chloride and vinyl acetate having a shrinkage temperature of about 65° C., and yarns comprising regenerated cellulose fibers were knit on a circular knitting machine to provide a sleeve-like pre-form about 10" in length. The sleeve was made up of regularly alternating rings one set of rings comprising several courses of yarns formed from the copolymeric fibers, and the alternating set of rings comprising a like number of courses of yarns formed from regenerated cellulose fibers. The sleeve was then placed over a drinking tumbler, the bottom end of the sleeve being smoothly tucked under the tumbler, and the top and bottom rings of the sleeve, which consisted of the copolymeric fibers, were rolled smoothly. The glass was then dipped in water which had been heated to a temperature of about 90° C. As a result of the heat diffusing through the yarn, the copolymeric fibers shrank and stiffened, as a result of which the sleeve was tightened in and assumed the shape of the glass. The glass was then removed from the heated water and allowed to cool and dry at normal room temperature. The shrunk and stiffened copolymeric fibers were set in that condition. The shaped jacket was readily removable from the glass. It was self-sustaining, did not collapse upon itself when placed on a flat surface, and had a comparatively soft and pleasant feel, and a glossy appearance.

*Example II*

Yarns comprising fibers formed from a copolymer of vinyl chloride and vinyl acetate having a shrinkage temperature of about 65° C. and yarns comprising fibers formed from cellulose acetate were fabricated on a circular knitting machine to produce a sleeve-like pre-form about 12" long, and which consisted of a series of rings comprising the copolymeric fibers alternating regularly with rings comprising cellulose acetate fibers, the bottom edge comprising about 12 courses of yarns comprising cotton fibers. The sleeve was placed over a small flower pot, the bottom edge thereof being smoothly tucked under the pot. The ensemble was subjected to heat at a temperature of about 90° C. During the heat-treatment the copolymeric fibers shrank and stiffened, shaping the sleeve to the contours of the flower pot. After cooling, the sleeve was set in the shaped condition. The cotton threads occurring at the inner periphery of the open end wall thereof were unraveled leaving a flat bottom portion upon which the pot rested firmly. The jacket was self-sustaining and maintained its shape without curling.

*Example III*

Yarns formed from fibers of a copolymer of vinyl chloride and acrylonitrile having a shrinkage temperature of about 100° C., and yarns formed from fibers of a synthetic linear polyamide having a shrinkage temperature of about 200° C. were fabricated on a circular knitting machine to produce a one-piece sleeve-like preform comprising rings made up of the copolymeric fibers alternating regularly with rings made up of the polyamide fibers. The sleeve was placed over a flower pot with its bottom end tucked smoothly under the pot and the top and bottom edges of the sleeve were rolled. The ensemble was then heated to about 125° C. to effect shrinkage and stiffening of the copolymeric fibers. The sleeve assumed the contours of the flower pot, and was cooled to set it in the shaped condition.

*Example IV*

Yarns comprising fibers formed from a copolymer of vinyl chloride and vinyl acetate having a shrinkage temperature of about 65° C. were knit on a circular knitting machine to provide a sleeve-like pre-form about 10" in length. The sleeve was then placed over a drinking tumbler, the bottom end of the sleeve being tucked smoothly under the tumbler, and the top and bottom edges of the sleeve were rolled. The tumbler and sleeve were then dipped in water which had been heated to a temperature of about 90° C. The copolymeric fibers shrank and stiffened, as a result of which the sleeve tightened in and assumed the contours of the tumbler. The sleeve was then removed from the heated water bath and allowed to cool at room temperature to set the copolymeric fibers in the heat-shrunk and stiffened condition. Upon removal of the shaped jacket from the tumbler, it was self-sustaining, did not collapse upon itself when placed on a flat surface, and was comparatively soft and pleasing to the touch.

It will be obvious that changes and modifications may be made without departing from the spirit and scope of the invention which is not to be limited except as defined by the appended claims.

We claim:

1. An assembly consisting of a shaped object having a peripheral wall and a flat bottom end wall, and a removable knitted jacket for the object, said jacket having a peripheral wall and a bottom end wall having a centrally disposed substantially circular opening therein, the jacket comprising courses of yarns formed from thermoplastic fibers having a relatively low shrinkage temperature, said thermoplastic fibers being heat-shrunk and stiffened, the walls of the jacket being provided with rolled rims comprising heat-shrunk and stiffened thermoplastic fibers, and the bottom wall of the jacket lying flat against the bottom wall of the shaped object.

2. An assembly consisting of a shaped object having a peripheral wall and a flat bottom end wall, and a removable knitted jacket for the object, said jacket having a peripheral wall and a bottom end wall having a centrally disposed, substantially circular opening therein, the jacket being composed of courses of yarns formed from thermoplastic fibers having a relatively low shrinkage temperature, and courses of yarns formed from fibers which are substantially unaffected at temperatures at which the fibers of low shrinkage temperature shrink and stiffen, the more readily shrinkable fibers in the jacket being heat-shrunk and stiffened, the walls of the jacket being provided with rolled rims comprising heat-shrunk and stiffened thermoplastic fibers, and the bottom wall of the jacket lying flat against the bottom wall of the object.

3. An assembly according to claim 1 in which the heat-shrunk and stiffened fibers in the jacket are fibers of a copolymer of vinyl chloride and vinyl acetate.

4. A pre-form in the shape of a seamless knitted sleeve comprising courses of yarn formed from thermoplastic fibers having a comparatively low shinkage temperature, said sleeve being adapted to simultaneously permanently assume the contours of an object having a peripheral wall and a flat bottom end wall due to shrinking and stiffening of the more heat-responsive fibers upon the application of heat to the sleeve while it is in place on the object with one end thereof tucked under the bottom end wall of the object to form a jacket therefor having a peripheral wall and a bottom end wall having a centrally disposed substantially circular opening therein, the walls of the jacket being provided with rolled rims comprising heat-shrunk and stiffened thermoplastic fibers and the bottom end wall of the jacket being adapted to lie flat against the bottom end wall of the object.

5. A pre-form in the shape of a seamless knitted sleeve composed of courses of yarns formed from thermoplastic fibers having a comparatively low shrinkage temperature, and courses of yarns formed from fibers which are not effected at temperatures at which the fibers of low shrinkage temperatures shrink and stiffen, said sleeve being adapted to substantially permanently assume the contours of an object having a peripheral wall and a flat bottom end wall, due to shrinking and stiffening of the more heat-responsive fibers upon the application of heat to the sleeve while it is in place on the object with one end thereof tucked under the bottom end wall of the object, to form a jacket therefor having a peripheral wall and a bottom end wall having a centrally disposed substantially circular opening therein, the walls of the jacket being provided with rolled rims comprising heat-shrunk and stiffened thermoplastic fibers, and the bottom end wall of the jacket being adapted to lie flat against the bottom end wall of the object after unraveling of the cotton yarn from the heat-shrunk and stiffened jacket.

6. A pre-form in accordance with claim 4 in which the thermoplastic fibers having a comparatively low shrinkage temperature are fibers of a copolymer of vinyl chloride and vinyl acetate.

HOWARD E. SHEARER.
JOHN E. VAN NEST.

REFERENCES CITED

The following references are of record in the file of this patent:

UNITED STATES PATENTS

| Number | Name | Date |
|---|---|---|
| 2,004,656 | Fonville | June 11, 1935 |
| 2,035,384 | Hinchliff | Mar. 24, 1936 |
| 2,042,582 | Botts | June 2, 1936 |
| 2,262,861 | Rugeley et al. | Nov. 18, 1941 |
| 2,345,055 | Lilley et al. | Mar. 28, 1944 |
| 2,353,090 | Shelmire et al. | July 4, 1944 |
| 2,386,173 | Kulp et al. | Oct. 2, 1945 |